DANIEL NOBLES
NORMAN L. MEYERSON
INVENTORS ical

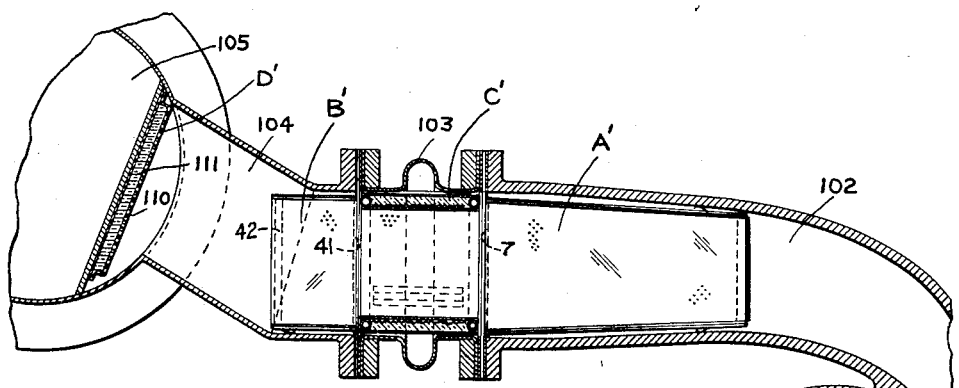

United States Patent Office 2,840,180
Patented June 24, 1958

2,840,180

MEANS FOR REDUCING ACOUSTICAL ENERGY IN A FLUID TRANSLATING SYSTEM

Daniel Nobles, Upper Montclair, and Norman L. Meyerson, Glen Rock, N. J., assignors to Worthington Corporation, Harrison, N. J., a corporation of Delaware Application March 23, 1955, Serial No. 496,200

6 Claims. (Cl. 181—42)

This invention relates generally to a sound absorbing and reducing means adapted to be placed in a fluid translating system.

In fluid translating systems, for example, systems including an air or gas compressor connected in combination with one or more of the following units, a filter, scrubber, receiver, condenser, evaporator, accumulator, orifice, nozzle, Venturi tube, throttling valve or reactor (such as catalytic reaction vessel); obnoxious sound waves are developed incidental to the operation thereof which sound waves represent acoustical energy that is not economically recoverable for use in the system.

Several methods of reducing these audible sound waves have been tried such as coating the external surfaces of the conducting conduits and/or the operating members of the particular systems or using members in the conduits such as is shown in Patent No. 2,043,731 wherein absorption of acoustical energy is effected on the Helmholtz principle of the resonating chamber. However, while these methods acted to reduce the sound to a certain extent they did not reduce it to a point where it ceased to be a significant consideration in commercial installations.

The present invention overcomes this problem by using alternatively an absorption and reflecting panel or panels and an absorption and reflecting cartridge or liner at an optimum point in the fluid translating system, the panels and liner being constructed so that the porous layer of absorption material in between and relative to the perforated facing elements thereof have an air space between their adjacent faces not greater than the diameter of the perforations in the facing material, and the panels and liners are provided with means thereon for holding them in position in the passages of the fluid translating systems and in spaced relation to the walls of these systems.

The absorption coefficient produced by this construction for these panel and lining elements is the sum of the impedance of the porous layer of absorbing material utilized and the mass inductance of the perforated facing elements produced in this relationship; the absorbing and reducing of acoustical energy is effected by converting the greater part thereof into heat energy. Reflected waves out of phase in the areas between the perforations on the facing materials also act to reduce acoustical energy and to reduce the effect of standing waves.

Accordingly, it is an object of the present invention to provide sound absorbing and reducing elements for a fluid translating system to reduce and absorb acoustical energy developed therein.

It is another object of the present invention to provide sound absorber and reducing elements which can be easily mounted in an old or a new system at either the best available location if the installation is already in position, or at the most desirable location if the system is being manufactured.

Further objects and advantages of the invention will be apparent from the following description with reference to the drawings, in which:

Figure 1 is a side view partly in section of one form of the invention.

Figure 2 is a top view of one of the panel sections shown in Figure 1.

Figure 3 is a section taken on 3—3 of Figure 1.

Figure 5 is a perspective view of another type panel shown in Figure 1.

Figure 6 is a sectional view taken on 6—6 of Figure 1.

Figure 9 is an enlarged sectional view of one end of the panel shown in Figure 1.

Figure 10 is a side view partly in section of another form of the invention.

Figure 7:
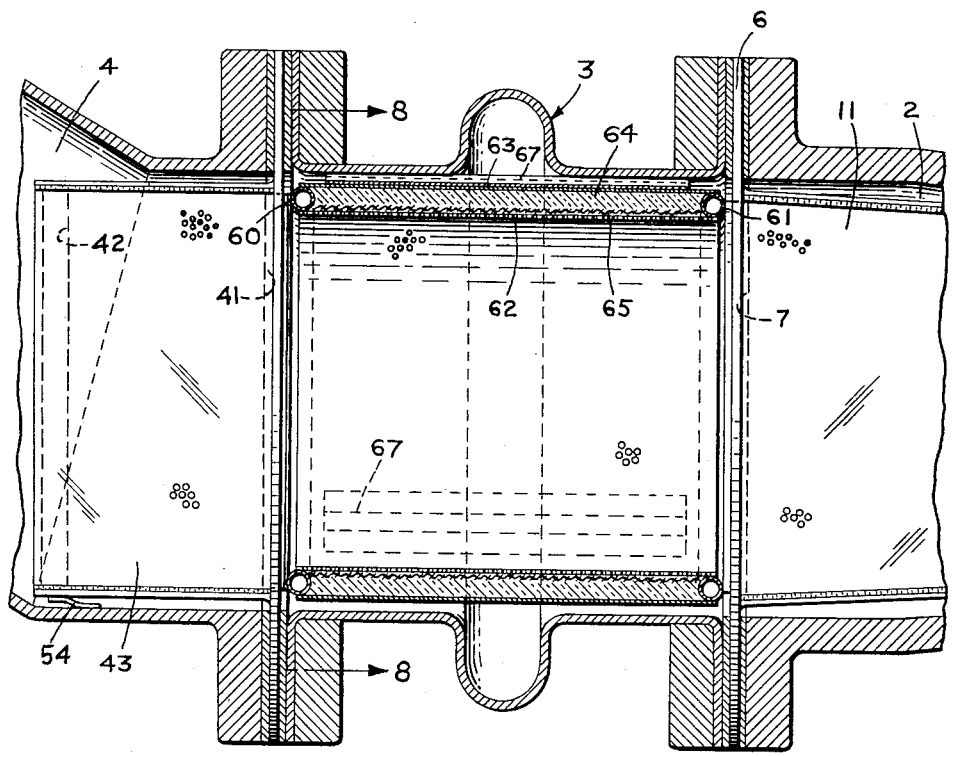
Figure 7 is an enlarged view of the liner shown in Figure 1.
Figure 4:
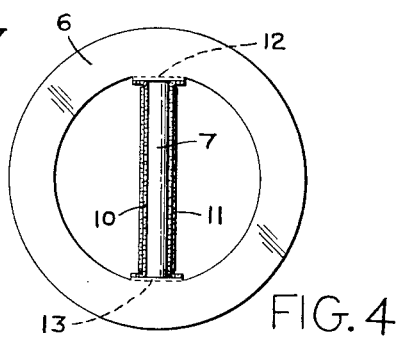
Figure 4 is a view taken on 4—4 of Figure 1.

The application of the present invention to a central refrigeration unit, only a portion of which is shown in the drawings is only by way of illustration and is not intended to thereby limit the present invention, and it will be understood that the present invention can be applied in any of the conduits of a fluid translating system in a similar fashion as that shown for the central refrigeration unit without departing from the spirit of the present invention.

Thus, referring to the drawings, Figure 1 shows a fragment of a compressor 1 having a discharge outlet 2 connected by an expansion joint 3 to the inlet 4 of a condenser 5. Mounted in the discharge outlet 2 and the inlet 4 are absorption panels A and B, while in the expansion joint 3 is a cartridge-like absorption liner C all more fully described hereinafter.

Absorption panels

The absorption panel A as shown in Figures 1, 2, 3, and 4, is an elongated substantially flat member shaped to conform to the shape of the bore in which it is mounted. It comprises an annular attaching or connecting element 6 at one end having the first or front support member 7 of a first absorption element generally designated 8 connected transversely thereof. It will be understood that while these panels are shown as vertically disposed they may be horizontally disposed by merely repositioning the connecting element 6 for the conditions of fluid flow through the apparatus in which they are mounted. Spaced from the first support member 7 in the first absorption element 8 is a second or rear support element 9. The first and second support elements 7 and 9, respectively, provide means for attaching perforated facing members 10 and 11 of any suitable material such as sheet steel or the like in spaced relation to each other, as is clearly shown in Figures 2 and 3 of the drawings.

End closures 12 and 13 are fixedly connected to the opposite open ends of the perforated facing members to form a chamber for any suitable type absorption material, generally designated 14, which may be fiberglass or the like type of absorption material. On either side of the porous absorption material 14 between the outer surface of the absorption material and the inner surface of the perforated facing members 10 and 11, respectively, are screen elements 15 and 16 which act to prevent fibers of the absorption material from escaping into the fluid stream during operation of the fluid translating system.

As is also shown in Figures 1, 2 and 3 of the drawings, the absorption panel A also includes a second absorption element generally designated 20. The second absorption element is substantially identical to the first absorption element, above described, except that it is adapted to be connected to the first absorption element as hereinafter described. The purpose of constructing the absorption panel A in two parts is to allow the panel to be mounted or inserted in a fluid translating system which has already been installed with a minimum amount of dismantling of the various parts of the system, that is, just enough to allow the absorption elements 8 and 20 to be inserted into the ducts and joined to one another as is indicated in Figures 1, 2 and 3 of the drawings.

Thus, the second or rear absorption element 20 also comprises a first or front support member 21 and a second or rear support member 22 which provides means for attaching perforated facing members 23 and 24 thereto in spaced relation. The perforated plates are substantially identical to those shown and described for the first element 8. End closures 25 and 26 act to form a chamber in which, similar to the first absorption element 8, an absorption material is disposed. Screening elements 28 and 29 are also provided between the outer surface of the absorption material 27 and the inner surface of the perforated facing members 23 and 24 for the purpose above described.

The perforated facing members 23 and 24 extend past the front support 21 of the second absorption element to form the projections 30 and 31 thereon. These projections provide means to connect the second absorption element to the first absorption element as the projections 30 and 31 are spaced just sufficiently wide to fit in snug engagement with the outer surfaces of the perforated facing members of the first absorption element. As is indicated in Figure 3, the second absorption element can be moved into engagement with the first absorption element until the rear support member 9 and the front support member 21 of the respective absorption elements 8 and 20 are in abutment with each other.

In assembled position the annular connecting member 6 is held between the flange 32 of the discharge outlet 2 and one of the flanges 33 of the expansion joint 3, it being understood that if these were ordinary conduits and connecting conduits in any fluid translating system that the attaching means would be very similar. Suitable gaskets 34 and 35 are provided on opposite sides of the annular connecting means 6 to adjust the relative position thereof to suit the installation.

The flanges 32 and 33 hold the absorption panel A in the desired horizontal or vertical position and, as indicated, the panel A is mounted to extend into the conduit from the flange 32. The spacing members 36 hold the absorption panel in spaced relation to the inner surface of the discharge outlet into which the panel extends and thus act to fix the radial position of the panel.

Absorption panel B is similar in construction to absorption panel A and accordingly is a flat member comprising an annular connecting element 40 having the usual front support 41 transversely disposed on said connecting member.

Spaced from the front support 41 is a second or rear support 42 to provide means for mounting the perforated facing members 43 and 44 thereon in spaced relation to each other. End closures 45 and 46 at opposite ends of said perforated facing members form a chamber therewith in which the porous absorption material, generally designated 47, is mounted with the screening element 48 and 49 on opposite sides thereof as was similarly described for the first and second panel elements 8 and 20, all of which is clearly shown in Figures 1, 5 and 6 of the drawings.

The absorption panel B is mounted by means of the annular connecting member 40 between the flange 50 of the inlet duct 4 and the flange 51 of the expansion joint 3 remote from the flange 33 connecting the annular connecting member 6 of the absorption panel A. Suitable gaskets 52 and 53 are similarly provided to axially position the absorption panel B which extends inwardly into the inlet as shown in Figure 1 of the drawings. A suitable spacer 54 is provided to space the absorption panel B from the wall of the inlet 4 when it is in assembled position.

The upper end closure 46 is also shown as having a reduced shoulder as at 55 to produce an elongated portion 56 which portion is so shaped as not to interfere with the free flow of fluid through the fluid translating system.

*Absorption liner*

The absorption liner C differs from the absorption panels A and B in that the liner takes a hollow cylindrical shape rather than the flat shape of the panels. However, the components of the liner or the members which make up the liner are similar to those of the panel.

Figure 8:
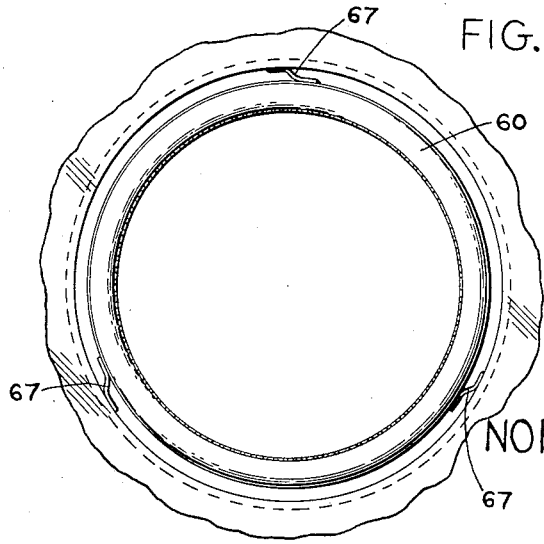
Figure 8 is an end view of the liner taken on 8—8 of Figure 7.

Thus, Figures 1, 7 and 8 show that the absorption liner comprises spaced annular support members 60 and 61 on the outer and inner periphery of which are mounted an inner perforated facing member 62 and an outer non-perforated facing member 63. The inner perforated facing member 62, the outer non-perforated facing member 63, and the annular support members 60 and 61 disposed at either end thereof form a chamber therebetween in which suitable absorption material 64 may be disposed. On the inner periphery of the absorption material 64 adjacent the respective inner surfaces of the inner perforated facing element 62 is a screen member 65 which, as above mentioned for the absorption panels, prevents fibers of the absorption material from escaping into the fluid stream and the fluid translating system.

The absorption liner is shown as mounted in the expansion joint 3 between the absorption panel A and the absorption panel B. In effect, as the fluid flow passes through the discharge outlet 2 the absorption panel A acts as a splitting element and thereafter the absorption liner C acts as a collecting element, the flow following therethrough to once again be split by the absorption panel B whence it passes out through the inlet 4 of the condenser. The arrangement of a splitting panel and a collecting liner acts to reduce and absorb the standing waves and also to absorb the acoustical energy which is developed by the fluid as it passes through the fluid translating system. The effect of the additional splitting panel which can of course be horizontal or vertical, is to increase the total effect of reducing the standing waves and absorbing the acoustical energy. It is understood and believed obvious that although this arrangement is shown in the particular location of a refrigeration cycle that it could be at any point in the fluid translating system at which optimum results could be obtained by such a basic relationship between the absorbing panel and liner.

Thus, the absorption liner C in this position is disposed between the respective connecting members 6 and 40 of the absorption panels A and B and is prevented from moving by abutment with the respective support members 7 and 41 of the absorption panels A and B.

As in the case of the absorption panel, the absorption liner C is provided with circumferentially disposed spacer elements 67 which space the liner from the inner wall of the expansion joint as is clearly shown in Figures 7 and 8 of the drawings.

Figure 9 which is an enlarged section of one end of the absorption panel A is furnished to show that the air space between the inner surface of the perforated facings 23 and 24 and the porous absorption material 27 with the enclosing screens 28 and 29 is not greater than the diameter of the perforations in the facing material itself.

This particular relationship is illustrative of the relationship between the absorption materials, screens and perforated facings above described for each of the panels and the liner.

This relationship provides an advantageous result in that the acoustical resistance of the absorption panels or the liner is increased due to the losses in the absorption material around the perforations in the perforated facing members. It has been found that if the absorption material and the enclosing screens is so disposed with respect to the perforated facing that the air space is greater than the diameter of the perforations in these facing elements that the acoustical resistance of the perforated facing elements drops almost to zero.

When sound waves or acoustical energy travels through the conducting conduits of the fluid translating system or, as is shown in Figure 9, through the discharge outlet 2, the portions thereof which pass through the perforations in the perforated facing elements are absorbed by conversion into heat energy in the absorption liners and panels or are reduced to a point where they are not transmitted to the walls of the conduits through which the sound waves are passing. The portions of the sound waves which are reflected off the surface of the absorption panels and liner out of phase will also act to reduce the standing waves present in the system.

Modified form of the invention

Figure 10 is a view of a modified form of the invention which can be used before the fluid translating system has been assembled and installed.

In this form of the invention, once again, only a portion of a refrigeration cycle unit is illustrated and thus a fragment of a compressor 101 is shown having its discharge outlet 102 connected through an expansion joint 103 to the inlet 104 of a condensing unit 105. Mounted in the discharge outlet 102 is a first absorption panel A', and in the inlet 104 a second absorption panel B', while disposed therebetween in the expansion joint is an obsorption liner C'.

The construction of the absorption panel B' and the absorption liner C' is identical with that above described in connection with the form of the invention shown in Figures 1 through 8.

The absorption panel A' differs from the absorption panel A described in the form of the invention shown in Figures 1 to 8 in that instead of comprising two members as is there shown it comprises a single elongated member.

This form of the invention, however, has, in addition to the indicated liner, a flat lining member D' which is disposed at the end of the inlet channel remote from the point where the absorption panels and absorption liner are disposed in the fluid translating system and transversely of the line of fluid flow. This member will also include the perforated facing elements 110 and a suitable absorption material 111 as has been above described for the other absorption elements. It will act in this system to reduce the standing waves and as an absorber for the normal incidents of sound waves which are not absorbed by the initial passage through the absorption panels and absorption liners.

It will be understood that the invention is not to be limited to the specific construction or arrangement of parts shown but that they may be widely modified within the invention defined by the claims.

What is claimed is:

1. In a fluid translating system including a compressor having a discharge passage, a flow passage in said fluid translating system, and a connecting joint between said discharge passage and said flow passage, the combination of a sound absorbing and reducing means including a splitter panel disposed in said discharge passage parallel to the line of fluid flow, a liner annular in cross section mounted in said connecting joint, connecting means at one end of said splitter panel, said connecting means disposed between said discharge passage and said connecting joint for fixedly positioning said splitter panel in said discharge passage, and means on said panel and said liner to hold them in spaced relation to the inner walls of said passage and said connecting joint.

2. In a fluid translating system as claimed in claim 1 wherein said panel and said liner each include facing members held in spaced relationship, at least one of said members of each of said panel and said liner being perforated, absorption material disposed between said facing members of each of said panel and said liner, and the respective face of said absorption material and the adjacent face of the perforated facing member of each of said panel and said liner disposed relative to each other a distance not greater than the diameter of the perforations in said perforated facing members.

3. In a fluid tanslating system including a compressor, an outlet passage for said compressor, a connecting conduit, flange means on said outlet passage and said connecting conduit for connecting said outlet passage to one end of said connecting conduit, and a flow passage connected to the other end of said connecting conduit, the combination of a sound absorbing and reducing means including a splitter panel disposed in said outlet passage parallel to the line of fluid flow in said system, annular connecting means at one end of said splitter panel, said annular connecting means disposed between said flange means to fixedly position said splitter panel in said outlet passage, a second splitter panel disposed in said flow passage, a liner annular in cross-section disposed in said connecting conduit between said splitter panels, and means on said panels and said liners holding them in spaced relation to the inner walls of said passages and said connecting conduit.

4. In a fluid translating system including a compressor, an outlet passage for said compressor, a flange on said outlet passage, a connecting conduit having a flange at one end connected to said flange on the outlet passage, a flow passage having a flange, and said connecting conduit having a flange at its other end connected to said flange and said flow passage, the combination of a sound absorbing and reducing means including a splitter panel disposed in said outlet passage in the line of fluid flow and having an annular connecting member at one end, said annular connecting member disposed between the flanges of said outlet passage and said connecting conduit to hold said splitter panel in fixed position relative to the line of fluid flow, an annular liner disposed in said connecting conduit, and means on said panel and said liner holding them in spaced relation to the inner walls of said outlet passage and said connecting conduit.

5. In a fluid translating system including a compressor, an outlet passage for said compressor, a flange on said outlet passage, a connecting conduit having a flange at one end connected to said flange on the outlet passage, a flow passage having a flange, and said connecting conduit having a flange at its other end connected to said flange and said flow passage, the combination of a sound absorbing and reducing means including a splitter panel disposed in said outlet passage in the line of fluid flow and having an annular connecting member at one end, said annular connecting member disposed between the flanges of said outlet passage and said connecting conduit to hold said first splitter panel in fixed position relative to the line of fluid flow, a second splitter panel disposed in said flow passage parallel to the line of fluid flow and having a second annular connecting member at one end thereof, said annular connecting member disposed between the flanges of said connecting conduit and said flow passage to fixedly position said second splitter panel in said flow passage relative to the line of fluid flow, an annular liner disposed in said connecting conduit in abutting relation to said first and second splitter panels, and means on said panels and said liner holding them in spaced relation to the inner walls of said passages and said connecting conduits.

6. In a fluid translating system including a compressor, an outlet passage for said compressor, a flange on said outlet passage, a connecting conduit having a flange at one end connected to said flange on the outlet passage, a flow passage having a flange, and said connecting conduit having a flange at its other end connected to said flange and said flow passage, the combination therewith of a splitter panel disposed in said outlet passage in the line of fluid flow and having an annular connecting member at one end, said annular connecting member disposed between the flanges of said outlet passage and said connecting conduit to hold said first splitter panel in fixed position relative to the line of fluid flow, a second splitter panel disposed in said flow passage parallel to the line of fluid flow and having a second annular connecting member at one end thereof, said annular connecting member disposed between the flanges of said connecting conduit and said flow passage to fixedly position said second splitter panel in said flow passage relative to the line of fluid flow, an annular liner disposed in said connecting conduit in abutting relation to said first and second splitter panels, means on said panels and said liner holding them in spaced relation to the inner walls of said passages and said connecting conduits, and an absorption panel mounted transversely in said flow passage at a point remote from the point where said second splitter panel is mounted in said flow passage.

References Cited in the file of this patent

UNITED STATES PATENTS

| | | |
|---|---|---|
| 1,948,211 | Fritz | Feb. 20, 1934 |
| 1,968,456 | Kliefoth | July 31, 1934 |
| 2,065,343 | Moore et al. | Dec. 22, 1936 |
| 2,088,922 | Porteous | Aug. 3, 1937 |
| 2,491,445 | Cunningham et al. | Dec. 13, 1949 |
| 2,491,876 | Schoenfeld et al. | Dec. 20, 1949 |
| 2,674,336 | Lemmerman | Apr. 6, 1954 |
| 2,705,541 | Finch | Apr. 5, 1955 |

FOREIGN PATENTS

| | | |
|---|---|---|
| 666,774 | France | May 28, 1929 |
| 242,038 | Germany | Dec. 19, 1911 |